(12) United States Patent
Olenfalk

(10) Patent No.: US 9,749,378 B2
(45) Date of Patent: Aug. 29, 2017

(54) SYSTEM AND METHOD FOR EARLY MEDIA BUFFERING USING PREDICTION OF USER BEHAVIOR

(71) Applicant: SPOTIFY AB, Stockholm (SE)

(72) Inventor: Mikael Olenfalk, Stockholm (SE)

(73) Assignee: SPOTIFY AB, Stockholm (SE)

( * ) Notice: Subject to any disclaimer, the term of this patent is extended or adjusted under 35 U.S.C. 154(b) by 247 days.

(21) Appl. No.: 14/175,078

(22) Filed: Feb. 7, 2014

(65) Prior Publication Data

US 2015/0229684 A1 Aug. 13, 2015

(51) Int. Cl.
*G06F 3/00* (2006.01)
*H04L 29/06* (2006.01)
*G06F 3/041* (2006.01)

(52) U.S. Cl.
CPC ............ *H04L 65/60* (2013.01); *G06F 3/0416* (2013.01); *H04L 65/1059* (2013.01); *H04L 65/4084* (2013.01); *H04L 65/80* (2013.01)

(58) Field of Classification Search
CPC .... H04N 19/176; H04N 19/61; H04N 19/105; H04N 19/159; H04N 19/46; H04N 19/52; H04N 21/4384; H04N 19/109; H04N 19/112; H04N 19/16; H04N 19/196; H04N 19/463; H04N 19/577; H04N 19/70
See application file for complete search history.

(56) References Cited

U.S. PATENT DOCUMENTS

| 9,043,822 B1* | 5/2015 | Calzone ............. H04N 21/4508 725/14 |
| 2010/0161833 A1* | 6/2010 | Blewett ................. G06F 9/4446 710/6 |
| 2012/0062473 A1* | 3/2012 | Xiao ........................ H04N 5/76 709/219 |

* cited by examiner

*Primary Examiner* — Di Xiao
(74) *Attorney, Agent, or Firm* — Tucker Ellis LLP

(57) ABSTRACT

A system and method for early media buffering using prediction of user behavior. In accordance with an embodiment, a user interface displays a plurality of media options from which particular options can be selected. A click determination logic is configured so that a first event associated with a particular option, such as a click event, is passed singly to a media application without trapping for the possibility of a double-click. The media application interprets the first event as a likely selection by a user of the particular option, and uses information associated with the likely selection to begin buffering a corresponding media content. If a second event associated with the particular option is received within a subsequent time interval, then the second event is treated, like a double-click, as confirmation of the user's selection, and the corresponding media content is streamed from its media content buffer.

20 Claims, 10 Drawing Sheets

SYSTEM AND METHOD FOR EARLY MEDIA BUFFERING USING PREDICTION OF USER BEHAVIOR

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to the providing of data, such as music, videos, or other digital media content, in a networked environment, for example as streams of media, and are particularly related to a system and method for early media buffering using prediction of user behavior.

BACKGROUND

The digital media industry has evolved greatly within the past several years. Today, users enjoy the ability to access a tremendous amount of media content, such as music or videos, at any location or time of day, using a wide variety of computing systems, personal handheld entertainment devices, or other types of user device.

With the availability of reliable high-speed Internet connectivity, and advances in digital rights management, many users now stream media content, on demand, from other peer devices or from remote servers.

Such users expect their media streaming experience to be comparable in functionality and performance to that of a locally-stored media environment. However, streaming over a network necessarily requires communication of information to initialize the media stream for playing. Such initialization can result in a noticeable and unsatisfactory delay in the user's listening or viewing experience. These are generally the types of environment in which embodiments of the invention can be used.

SUMMARY

In accordance with an embodiment, described herein is a system and method for early media buffering using prediction of user behavior. In accordance with an embodiment, a user interface displays a plurality of media options from which particular options can be selected. A click determination logic is configured so that a first event associated with a particular option, such as a click event, is passed singly to a media application without trapping for the possibility of a double-click. The media application interprets the first event as a likely selection by a user of the particular option, and uses information associated with the likely selection to begin buffering a corresponding media content. If a second event associated with the particular option is received within a subsequent time interval, then the second event is treated, like a double-click, as confirmation of the user's selection, and the corresponding media content is streamed from its media content buffer. However, if no second event associated with the particular option is received within the subsequent time interval, then the buffer's contents can be discarded.

In accordance with various embodiments, the technique can be used to improve the response time in which data such as music, videos, or other media, can be streamed to a computing system, personal handheld entertainment device, or other type of user device, particularly in Internet, web-based, or similar environments.

DETAILED DESCRIPTION

Figure 1:
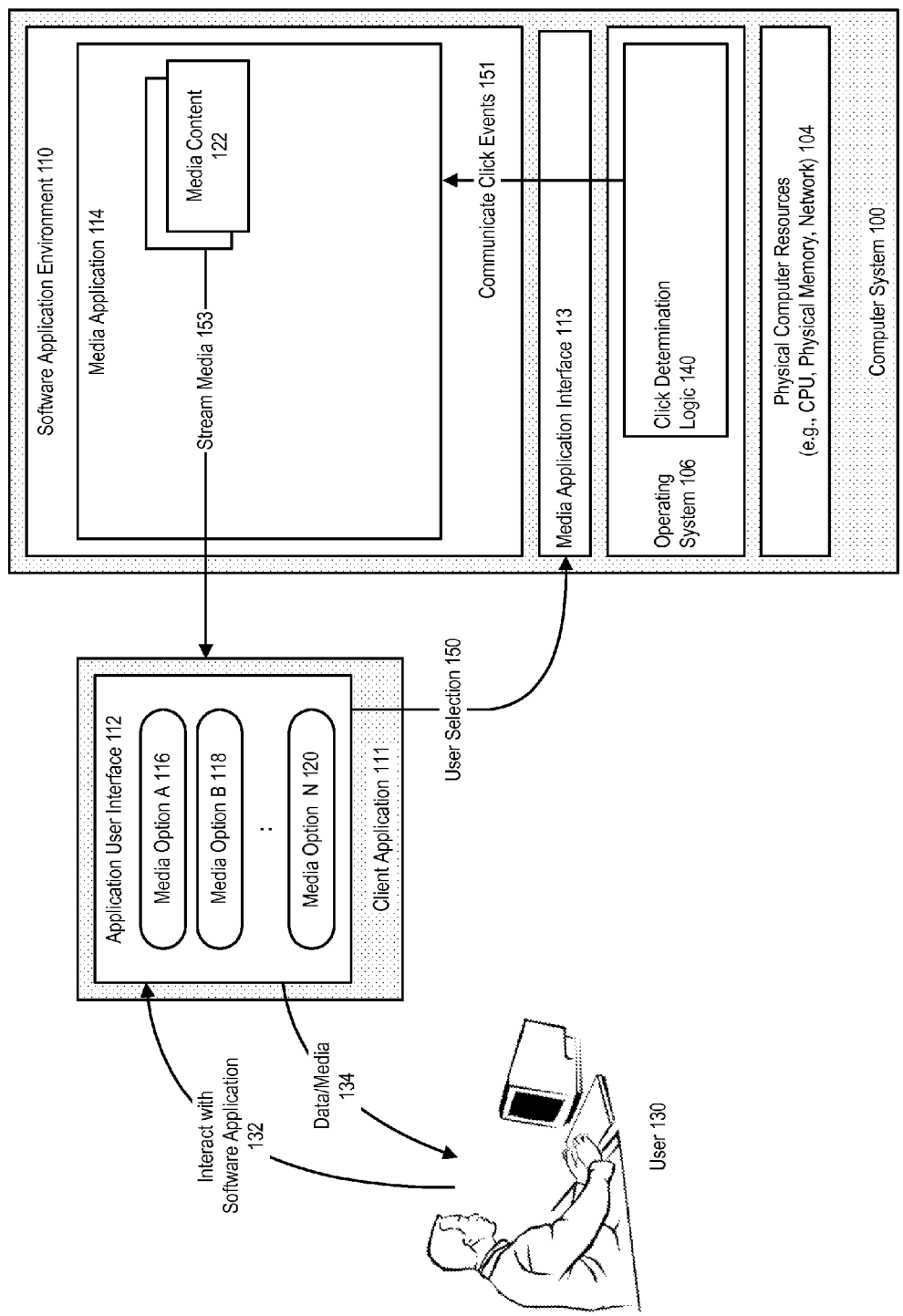
FIG. 1 illustrates a system for early media buffering using prediction of user behavior, in accordance with an embodiment.

As described above, with the availability of reliable high-speed Internet connectivity, and advances in digital rights management, many users now stream media content, on demand, from other peer devices or from remote servers. Such users expect their media streaming experience to be comparable in functionality and performance to that of a locally-stored media environment. However, streaming over a network necessarily requires communication of information to initialize the media stream for playing. Such initialization can result in a noticeable and unsatisfactory delay in the user's listening or viewing experience.

To address this, in accordance with an embodiment, described herein is a system and method for early media buffering using prediction of user behavior.

In accordance with an embodiment, a user interface displays a plurality of media options from which particular options can be selected. A click determination logic is configured so that a first event associated with a particular option, such as a click event, is passed singly to a media application without trapping for the possibility of a double-click. The media application interprets the first event as a likely selection by a user of the particular option, and uses information associated with the likely selection to begin buffering a corresponding media content. If a second event associated with the particular option is received within a subsequent time interval, then the second event is treated, like a double-click, as confirmation of the user's selection, and the corresponding media content is streamed from its media content buffer. However, if no second event associated with the particular option is received within the subsequent time interval, then the buffer's contents can be discarded.

In accordance with various embodiments, in addition to click events, other types of events can be recognized as predictive of user behavior to provide early buffering of media content. For example, in accordance with an embodiment, the deceleration of a user's mouse (or in the case of a touch-screen interface, their finger or stylus), can be interpreted as a likely selection by the user of a particular option, to begin buffering a corresponding media content; while a subsequent click or tap can be treated as confirmation of the user's selection.

In accordance with various embodiments, the technique can be used to improve the response time in which data such as music, videos, or other media, can be streamed to a computing system, personal handheld entertainment device, or other type of user device, particularly in Internet, web-based, or similar environments. For example, in a typical music streaming environment including a local or native client application which allows selection of song titles from a menu using a mouse, touch-screen or other means of input, when a user double-clicks on a song, the music may start playing within approximately 300 ms. With a web-based version of the client application, the time prior to start of music playback may be longer—approximately 1 second. The slowdown in web-based applications is largely due to key setup through the Internet or network, and the generally slower response when using, e.g., the HTTP protocol instead of a proprietary optimized protocol.

FIG. 1 illustrates a system for early media buffering using prediction of user behavior, in accordance with an embodiment. As shown in FIG. 1, a computer system 100 can include one or more physical computer resources 104, such as one or more processors (CPU), physical memory, network components, or other computer resources. An operating system 106 or other processing environment supports execution of a software application environment 110, including a media application 114 which can be used, for example, to stream music, video, or other forms of media content.

In accordance with an embodiment, a client application 111, which can be provided, for example, at the same or another computing system, a personal handheld entertainment device, or other type of user device, can include an application user interface 112 which displays or otherwise provides a plurality of media options 116, 118, 120. Selecting a particular option can be used as an instruction to the media application to return a corresponding particular item of media content 122.

For example, in accordance with various embodiments, the software application environment can be used to stream or otherwise communicate music, video, or other forms of media content, wherein the user interface can display a menu of song or video titles, which correspond to songs or videos stored in a media database.

As further shown in FIG. 1, in accordance with an embodiment, a user 130 can interact 132 with the application user interface and receive a corresponding result 134, for example the playing of a selected music or video on their user device.

In accordance with an embodiment, the user's selection of a particular media option is communicated 150 to the media application via a media application interface 113, the operating system, and a click determination logic 140, as one or more click events 151, which causes the media application to stream 153 or otherwise communicate the music, video, or other form of media content to the user device.

For example, in various embodiments, the user can select a particular song or video to be retrieved from a media database at the same or another computer system, and played on their user device.

Figure 2:
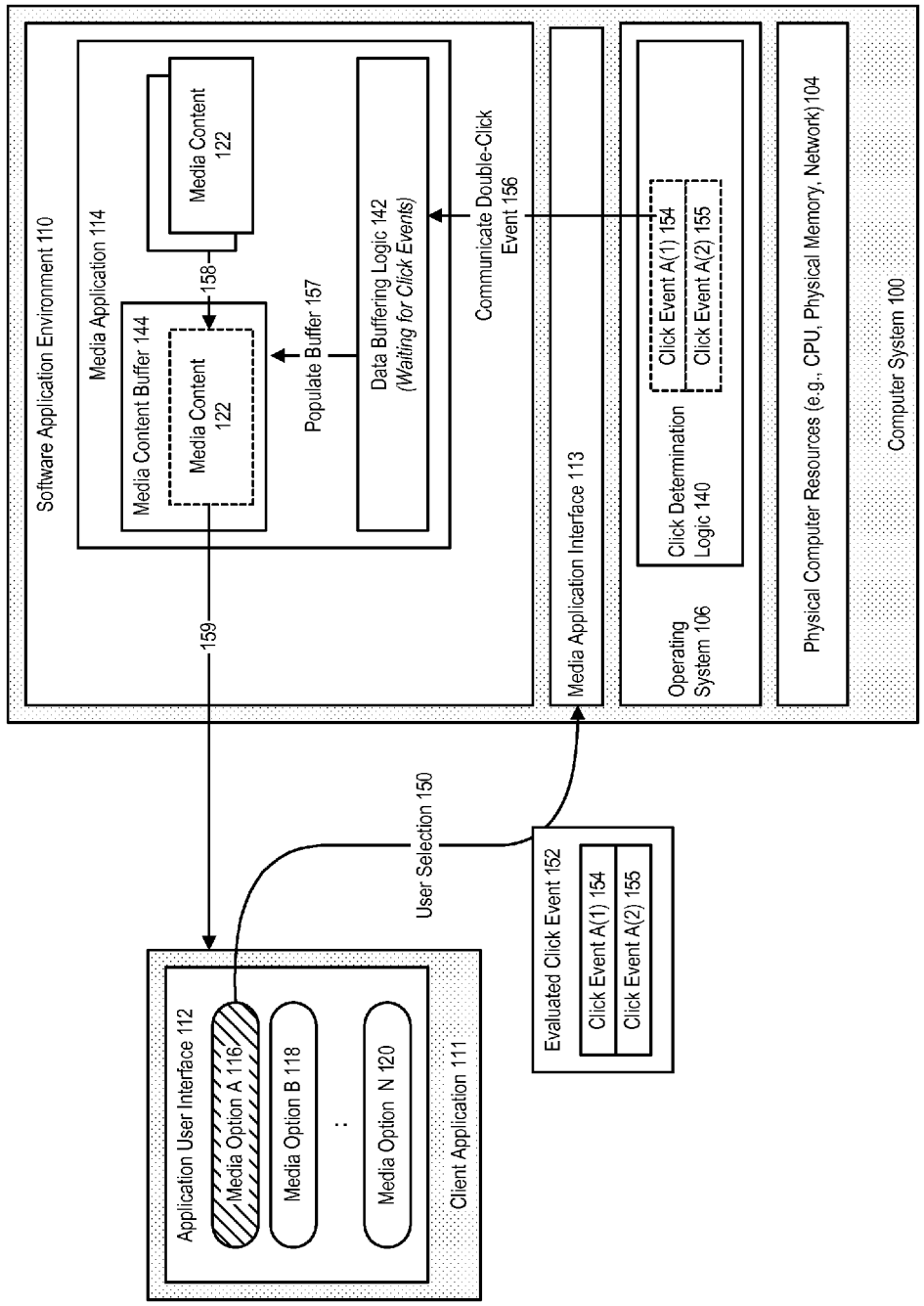
FIG. 2 further illustrates the use of a system for early media buffering, in accordance with an embodiment.

FIG. 2 further illustrates the use of a system for early media buffering, in accordance with an embodiment. As shown in FIG. 2, the media application can include a data buffering logic 142 and a media content buffer 144. In accordance with an embodiment, selection of a particular media option (illustrated in this example as option A 116) can be made by the user clicking or double-clicking in their application user interface on that option, which causes a click event to be evaluated 152 by the system.

In the example illustrated in FIG. 2, a double-click can include a combination of click events 154, 155 which are communicated to the operating system for evaluation. An operating system's click determination logic can be configured to trap for double-clicks, in which case it evaluates whether the combination of click events (154, 155) comprises a double-click. In a typical environment, the time between clicks that make up a double-click is usually between 200 ms and 500 ms. The operating system can then communicate 156 the double-click to the software application. Typically, the operating system can be configured to trap slower or faster instances of double-clicking (i.e., more or less time between the clicks respectively).

In accordance with an embodiment, the data buffering logic can use information associated with the selection, for example a key setup information, to instruct 157 the media application to populate 158 its media content buffer with the corresponding media content, e.g., music or video retrieved from a media database. The contents of the media content buffer can then be communicated 159 to the client application.

However, as described above, with web-based versions of a client application, the time prior to start of media playback may be longer than that with local or native versions, largely due to key setup through the Internet or network, and the generally slower response when using, e.g., the HTTP protocol instead of a proprietary optimized protocol.

Figure 3:
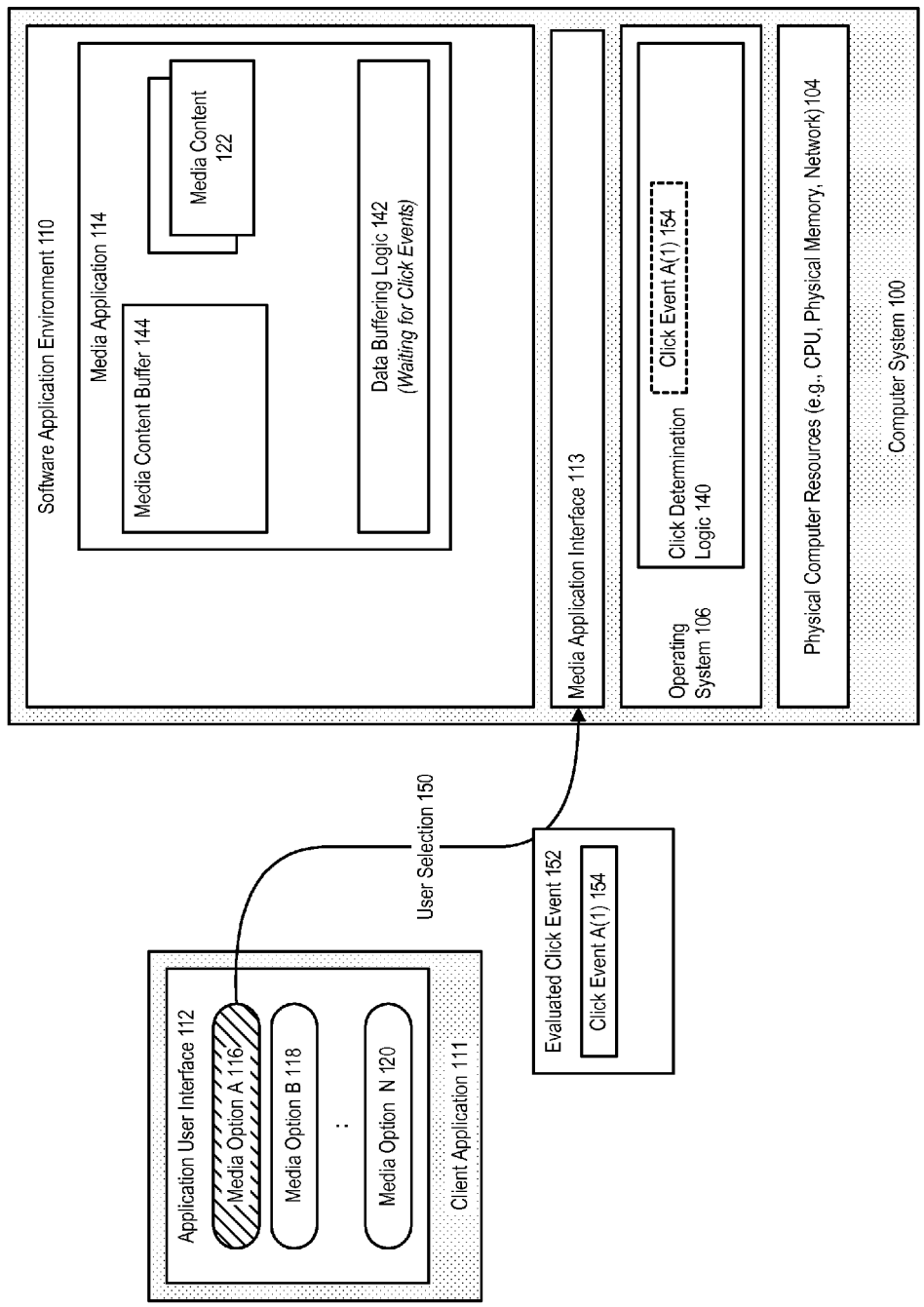
FIG. 3 further illustrates the use of a system for early media buffering, in accordance with an embodiment.

FIG. 3 further illustrates the use of a system for early media buffering, in accordance with an embodiment. In accordance with an embodiment, the click determination logic is configured so that a first click event on a particular option is passed singly to a media application without trapping for the possibility of a double-click. The media application interprets the first click event as a likely selection by a user of the particular option, and uses information associated with the likely selection to begin buffering a corresponding media content.

For example, in accordance with an embodiment, the click determination logic can be configured to not trap for any double-clicks, so that when a click event is received from a user it is always and immediately passed singly to the media application.

In accordance with an embodiment, a client application can instruct the operating system (locally or remote) that the client application is not interested in double-clicks, in which case the operating system will not trap for double-clicks.

Using the example previously illustrated in FIG. 2, in accordance with an embodiment, when configured to not trap for any double-clicks the click determination logic will instead evaluate the first click event (154), and pass it the media application singly.

Figure 4:
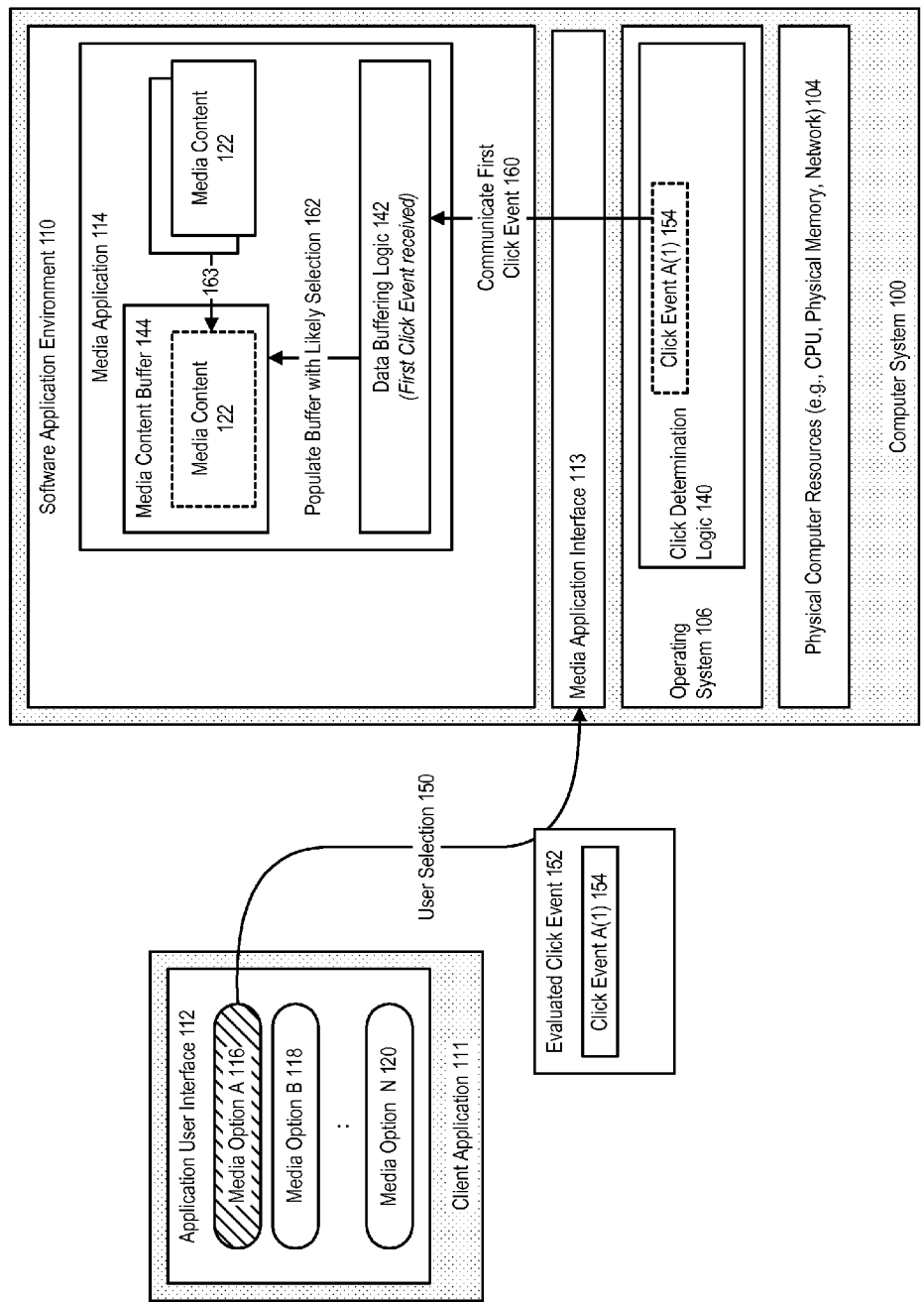
FIG. 4 further illustrates the use of a system for early media buffering, in accordance with an embodiment.

FIG. 4 further illustrates the use of a system for early media buffering, in accordance with an embodiment. As shown in FIG. 4, when a first click event is received, the click event can be passed singly 160 as a selection to the media application. In accordance with an embodiment, the data buffering logic can use information in the selection, for example the key setup information, to instruct 162 the media application to populate 163 its media content buffer with the corresponding music, videos, or other media retrieved from a media database. By doing this, the system effectively predicts, based on receiving and evaluating the first click event, that the user is likely to be in the process of double-clicking the selection to request the media.

For example, consider the local/native and web-based versions of client applications described above. When the click determination logic traps for double-clicks, this process may take between 200 ms and 500 ms to complete. In a web-based application, this can contribute to a delay of approximately 1 second prior to the start of music playback. By not trapping for double-clicks, and instead passing each click event singly, the perceived time to start of playing can be reduced to that of the time between clicks (for example, from 1 second to approximately 500 ms in a best case), which provides a noticeable improvement in the user's listening or viewing experience.

Figure 5:
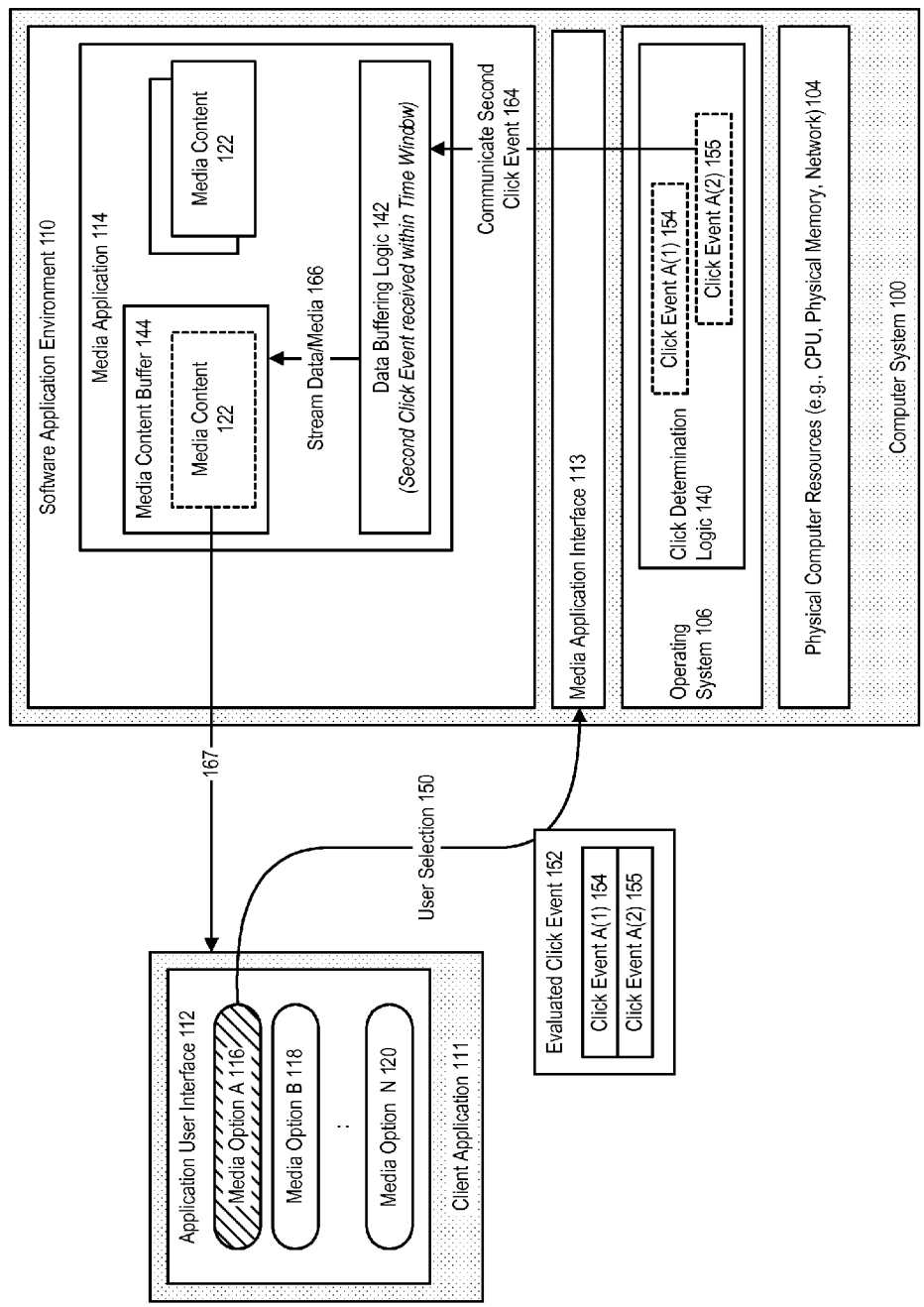
FIG. 5 further illustrates the use of a system for early media buffering, in accordance with an embodiment.

FIG. 5 further illustrates the use of a system for early media buffering, in accordance with an embodiment. As shown in FIG. 5, again when a click event is received it is always treated as a single click event and passed to the media application. In accordance with an embodiment, while the first click event (154) causes the data buffering logic to populate its media content buffer with the corresponding particular music, videos, or other media retrieved from a media database, the data buffering logic then waits for a second click event (155) to be received within a subsequent time interval, and communicated 164 to the media application.

In accordance with an embodiment, the length of the subsequent time interval can be configured or adjusted to suit the needs of a particular implementation.

In accordance with an embodiment, if a second click event on the particular media option is received within the subsequent time interval, then the second click event is treated as confirmation of the user's selection, and the media application causes 166 the corresponding media content to be streamed 167 from its media content buffer.

Figure 6:
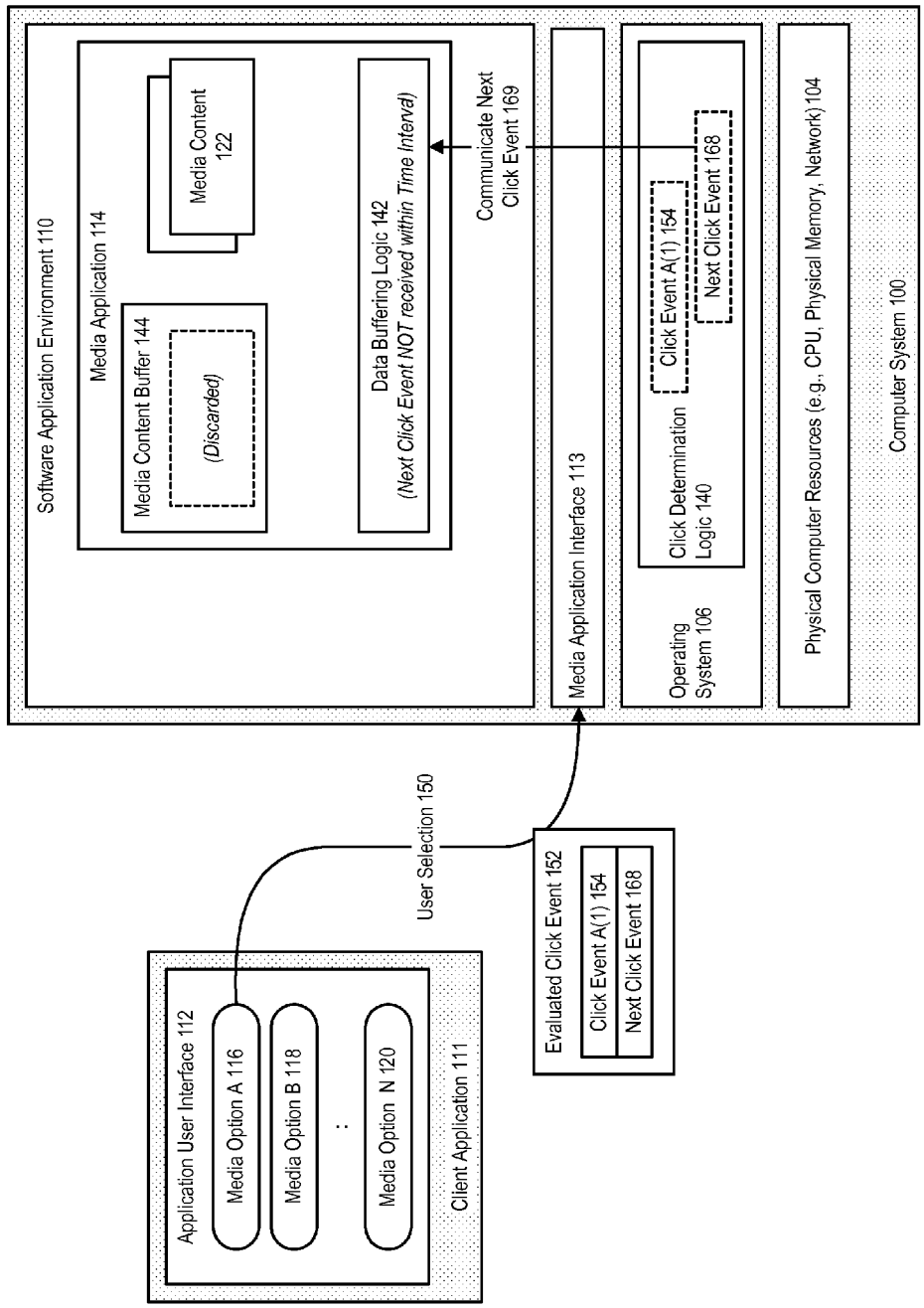
FIG. 6 further illustrates the use of a system for early media buffering, in accordance with an embodiment.

FIG. 6 further illustrates the use of a system for early media buffering, in accordance with an embodiment. As shown in FIG. 6, if no second or next click event on the particular option is received within the subsequent time interval, or alternatively if a next click event 168 is received from the user and communicated 169 to the software application but is determined to be outside the subsequent time interval, then the contents of the media content buffer can be discarded.

Figure 7:
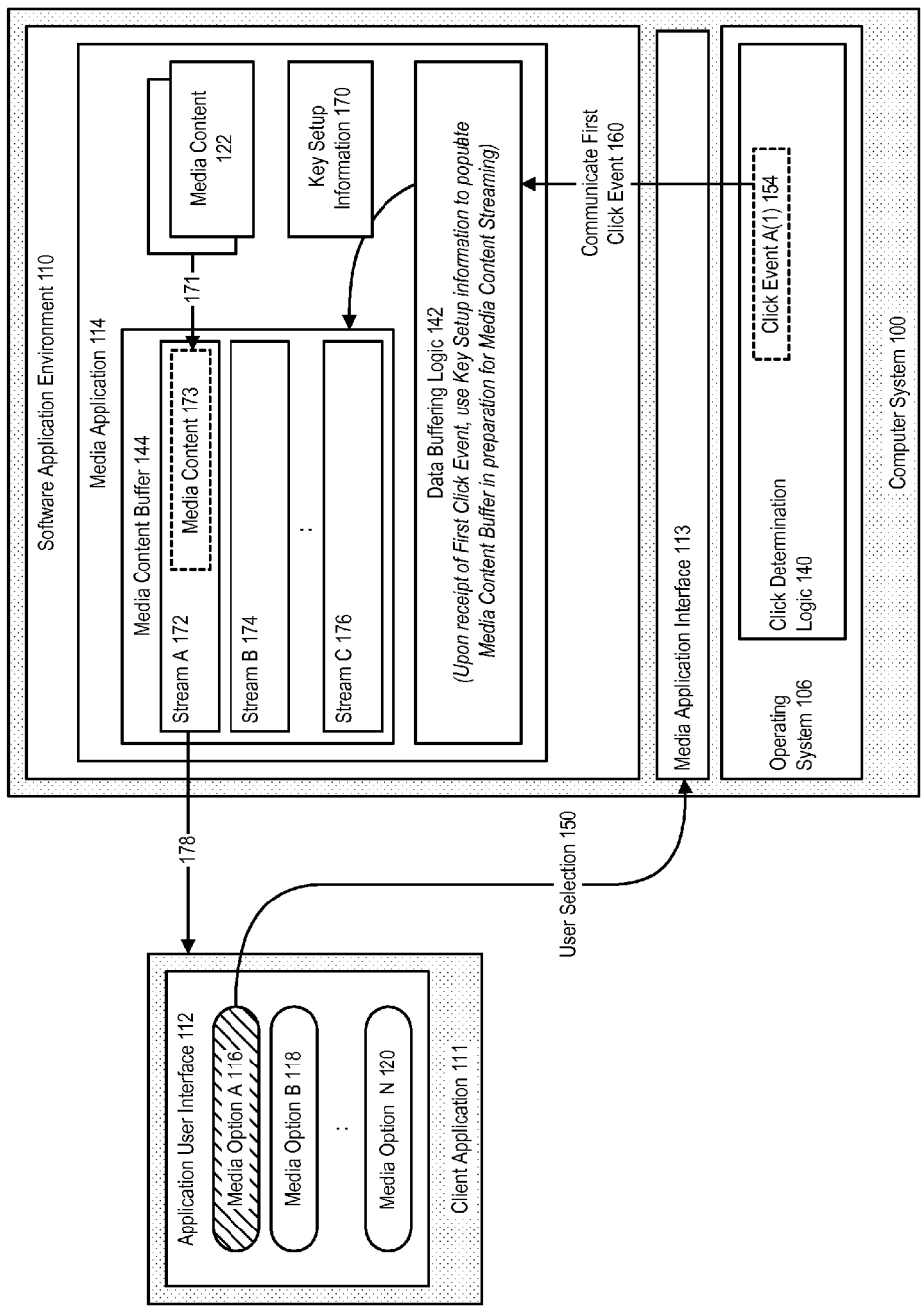
FIG. 7 illustrates a system for early media buffering using prediction of user behavior, including the use of streams, accordance with an embodiment.

FIG. 7 illustrates a system for early media buffering using prediction of user behavior, including the use of streams, accordance with an embodiment. As described above, in accordance with various embodiments, the software application environment can be used to stream or otherwise communicate music, video, or other forms of media content, wherein the user interface can display a menu of song or video titles, which correspond to songs or videos stored in a media database.

For example, as shown in FIG. 7, in accordance with an embodiment, in response to receiving the first click event, the data buffering logic can use information in the selection, for example key setup information 170, to instruct the media application to populate 171 one or more of a plurality of streams 172, 174, 176, with media content 173 corresponding to the particular music, videos, or other media retrieved from a media database. If a second click event on the particular option is received within a subsequent time interval, then the second click event is treated, like a double-click, as confirmation of the user's selection, and the corresponding media content is streamed 178 from its media content buffer. However, if no second click event on the particular option is received within the subsequent time interval, then the buffer's contents can be discarded.

As described above, in accordance with various embodiments, in addition to click events, other types of events can be recognized as predictive of user behavior to provide early buffering of media content, for example the deceleration of a user's mouse, or their finger or stylus on a touch-screen interface.

Figure 8:
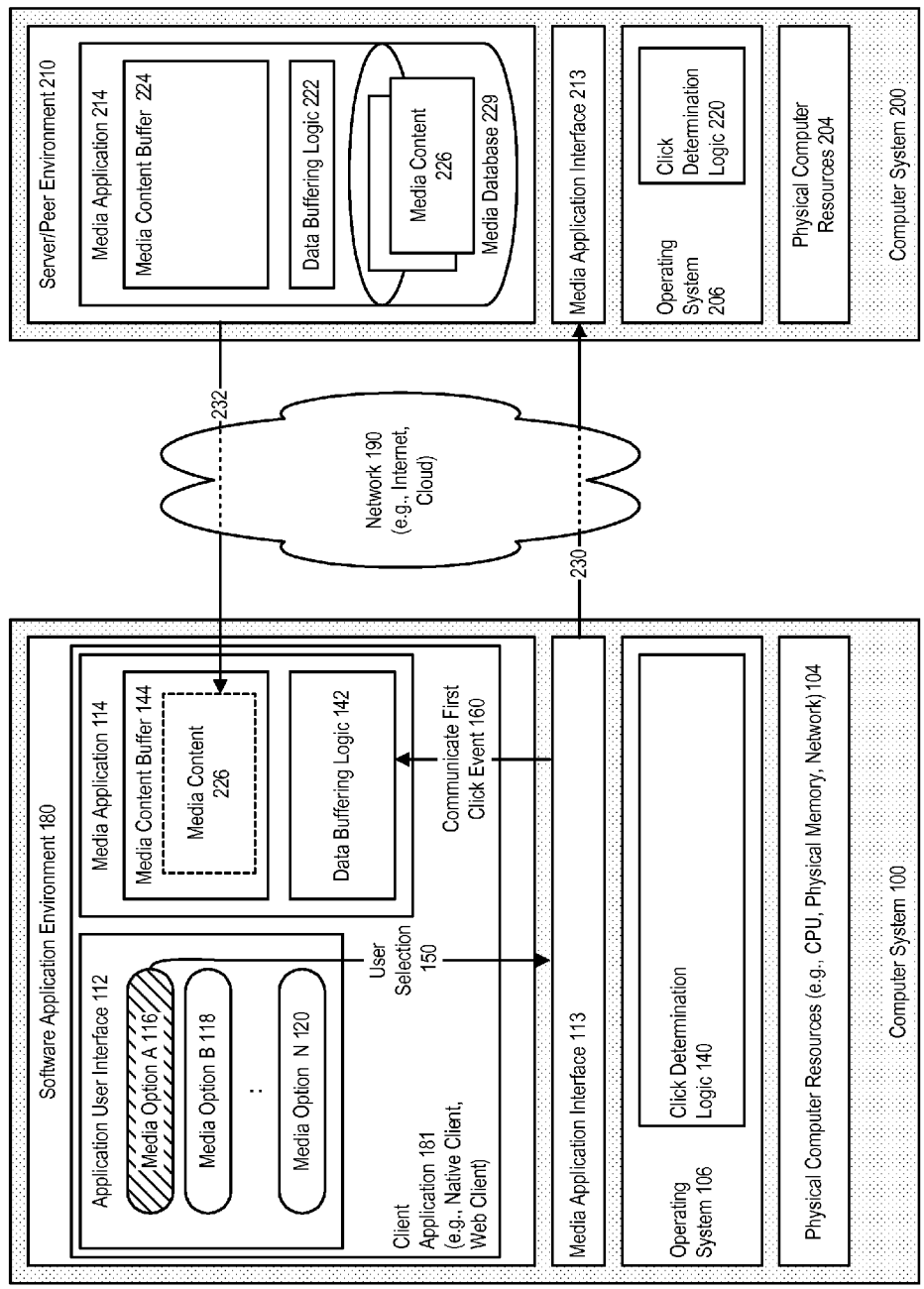
FIG. 8 illustrates an embodiment of a system for early media buffering, accordance with an embodiment.

FIG. 8 illustrates an embodiment of a system for early media buffering, in accordance with an embodiment. As shown in FIG. 8, in accordance with an embodiment, the software application environment 180 can include the application user interface, media application data buffering logic, and media content buffer, as part of a client application 181.

Depending on the particular embodiment, the client application can be provided, for example, as a native client application which communicates with peers or servers using proprietary communication protocols, or as a web client application which communicates with peers or servers using an Internet protocol such as the HTTP protocol.

As further shown in FIG. 8, a first computer system can communicate via a network 190, such as the Internet or a cloud, with a second computer system 200, similarly including physical computer resources 204, an operating system 206, media application interface 213, click determination logic 220, and a server/peer environment 210 that includes a media application 214, data buffering logic 222, and media content buffer 224. The second computer system can provide media content 226 within a media database 229.

In accordance with an embodiment, a user of a first computing system can issue a user selection, which can be processed as described above by the client application's local click determination logic and data buffering logic, to request 230, upon receipt of a first click event, population of its media content buffer with media content received 232 from a server/peer environment, and, upon receipt of subsequent click event within the subsequent time interval, to stream the requested media from the media content buffer.

Figure 9:
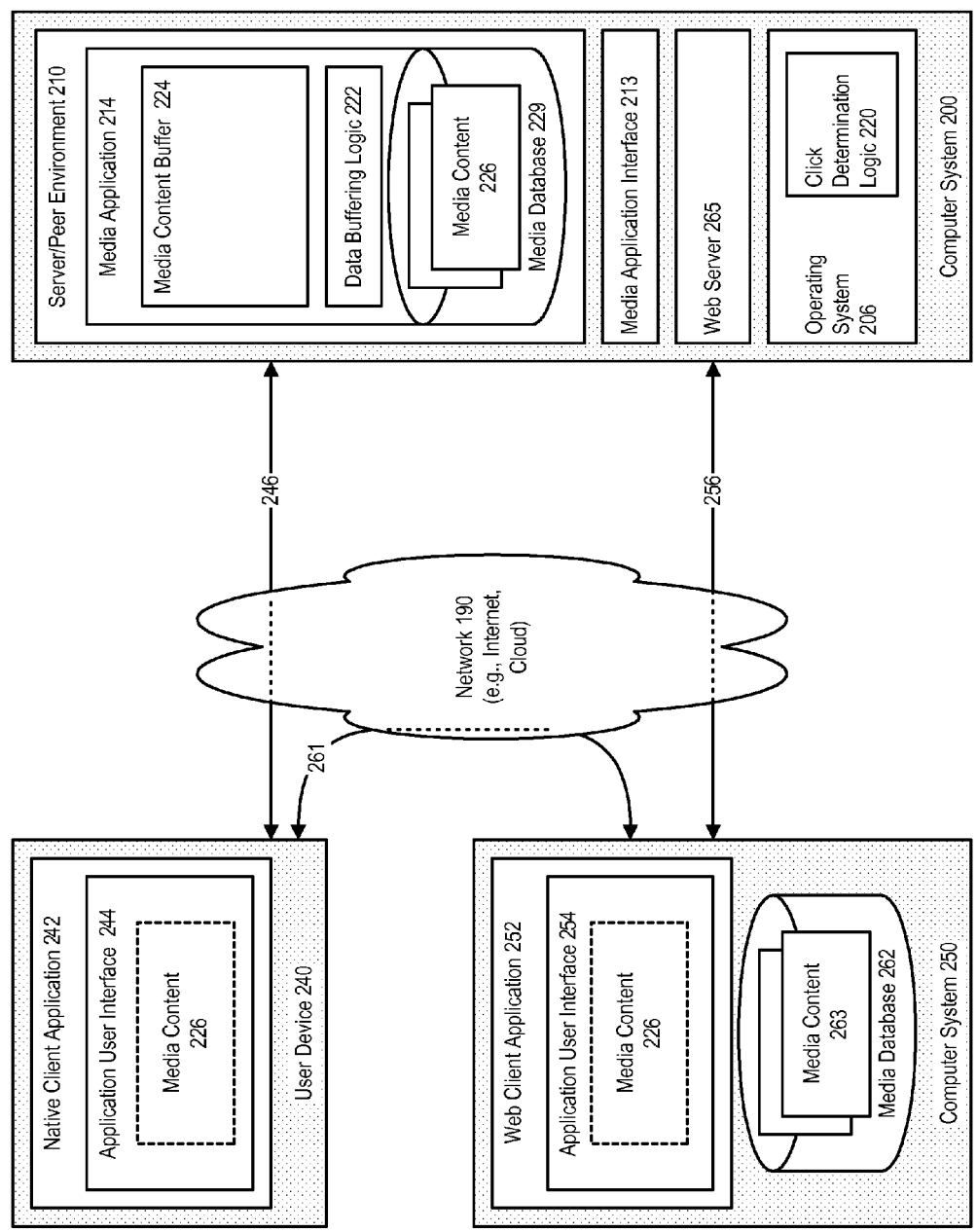
FIG. 9 illustrates how a system for early media buffering using prediction of user behavior, can be used within a networked environment, to support streaming of media content, in accordance with an embodiment.

FIG. 9 illustrates how a system for early media buffering using prediction of user behavior, can be used within a networked environment, to support streaming of media content, in accordance with an embodiment. As shown in FIG. 9, a server/peer application environment can include a plurality of user devices, for example one or more user devices 240 having a native client application 242 and application user interface 244; and one or more computer systems 250 having a web client application 252 and application user interface 254.

In accordance with an embodiment, each client application can request and receive media 246, 256 from a server/peer application, or, in accordance with an embodiment from one another 261, or from a media database 262 including media 263 at a peer within the network. Within each client application, click requests can be processed using some or all of the techniques described above.

In accordance with an embodiment, one or more of the systems can include a web server 265 that allows requests from web client applications to be received using the HTTP protocol.

Figure 10:
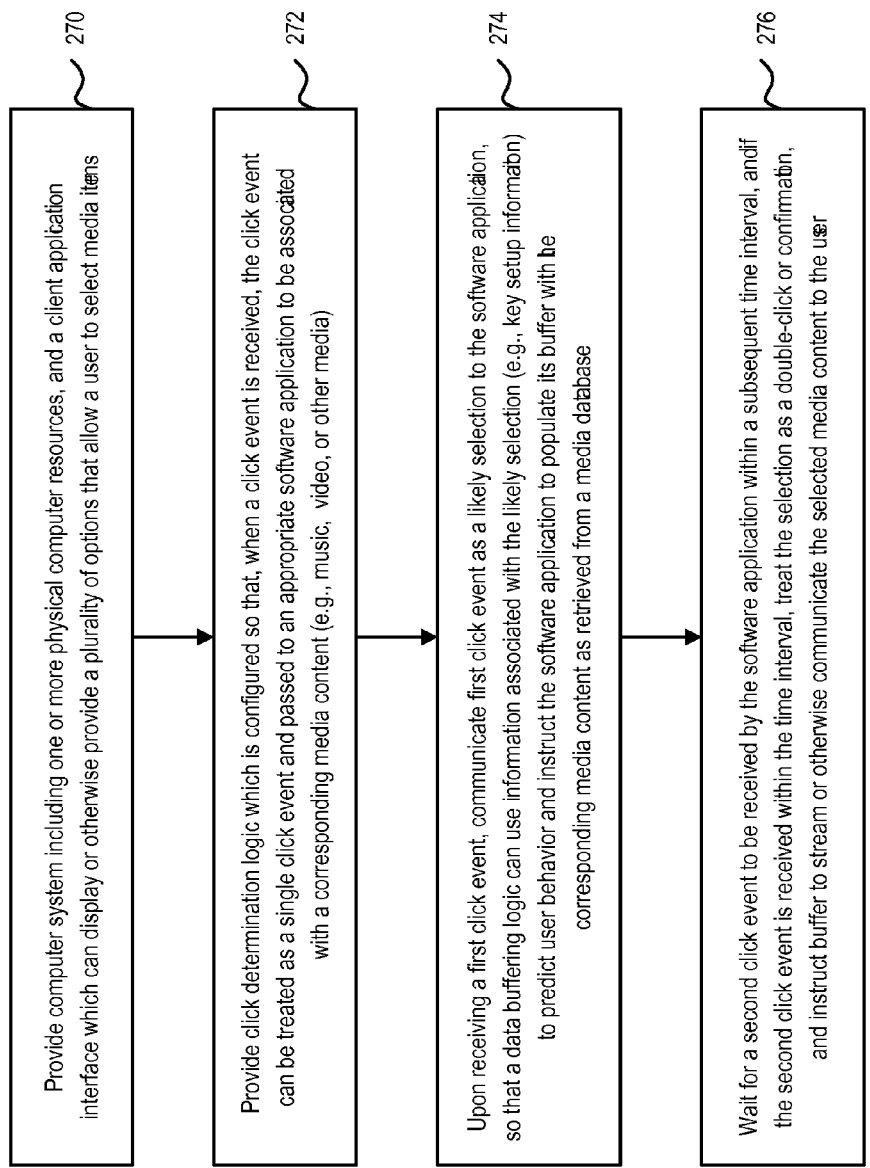
FIG. 10 illustrates a method for early media buffering using prediction of user behavior, in accordance with an embodiment.

FIG. 10 illustrates a method for early media buffering using prediction of user behavior, in accordance with an embodiment. As shown in FIG. 10, in accordance with an embodiment, at step 270, a computer system including one or more physical computer resources is provided, together with a user interface which can display or otherwise provide a plurality of options that allow a user to select media items.

At step 272, a click determination logic is configured so that, when a click event is received, the click event can be treated as a single click event and passed to an appropriate software application to be associated with a corresponding media content (e.g., music, video, or other media).

At step 274, upon receiving a first click event, the first click event is communicate as a likely selection to the software application, so that a data buffering logic can use information associated with the likely selection (e.g., key setup information) to predict user behavior and instruct the software application to populate its media content buffer with the corresponding media content as retrieved from a media database.

At step 276, the system waits for a second click event to be received by the software application within an subsequent time interval, and if the second click event is received within the subsequent time interval, treats the selection as a double-click or confirmation on, and instructs the media content buffer to stream or otherwise communicate the selected media content to the user.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art.

For example, while the examples provided above describe the handling of double-clicks, in accordance with other embodiments other types of events can be handled to predict user behavior and provide early buffering of media content. The embodiments were chosen and described in order to best explain the principles of the invention and its practical application, thereby enabling others skilled in the art to understand the invention for various embodiments and with various modifications that are suited to the particular use contemplated.

What is claimed is:

1. A system for early media buffering using prediction of user behavior, comprising:
    a computer, including a processor;
    a user interface, which displays a plurality of media options from which particular media options can be selected;
    a click determination logic which is configured so that a first click or other event associated with a particular media option at the user interface is passed singly to a media application, without trapping for a possible double-click event associated with the particular media option;
    wherein the media application includes a data buffering logic and a media content buffer;
    wherein the media application interprets the first click or other event associated with the particular media option as a likely selection by a user of the particular media option, and uses information associated with the likely selection of the particular media option to begin buffering a corresponding media content, including that
        the data buffering logic, in response to the first click or other event associated with the particular media option, instructs the media application to populate the media content buffer with the corresponding media content retrieved from a media database, and
        the media content buffer receives the corresponding media content from the media database, prior to streaming of the media content; and
    wherein the media application determines that,
        if a second click or other event associated with the particular media option is received at the user interface within a subsequent time interval, then the second click or other event is treated as confirmation of the user's selection, and the second click or other event is communicated to the data buffering logic, to cause the corresponding media content to be streamed from its media content buffer, and
        if the second click or other event associated with the particular option is not received within the subsequent time interval, then the media content in the media content buffer is to be discarded without being streamed.

2. The system of claim 1,
    wherein the user interface is provided by a client application at a user device, and enables selection of media content to be streamed to the user device,
    wherein the click determination logic, and the media application that includes the data buffering logic and the media content buffer, is provided at a computer system, and
    wherein the corresponding media content is retrieved from a media database at the computer system, to populate the media content buffer at the computer system, for streaming to the user device.

3. The system of claim 1, wherein the information associated with the likely selection of the particular media option is a key setup information, which the media application uses to determine the corresponding media content, and a stream to which the corresponding media content is to be streamed.

4. The system of claim 3, wherein the key setup information is used to instruct the media application to populate one or more of a plurality of streams with media content retrieved from the media database.

5. The system of claim 1,
    wherein the system includes a first computer system, and a second computer system, wherein the user interface, the click determination logic, and the media application that includes the data buffering logic and the media content buffer, are provided at the first computer system, and wherein the corresponding media content is retrieved from a media database at the second computer system, to populate the media content buffer at the first computer system.

6. The system of claim 5, wherein the second computer system includes a server or peer environment, and the corresponding media content in the media database at the second computer system is received from the server or peer environment.

7. The system of claim 1, wherein the other event associated with the particular media option comprises a tap on a touch-screen interface or a deceleration of a user input.

8. The system of claim 1, wherein the click determination logic, and the media application that includes the data buffering logic and the media content buffer, are provided at a first computer system, and the system further includes:
   one or more user devices, each comprising a native client application and a user interface, and
   a second computer system comprising a web client application and a user interface.

9. The system of claim 8, wherein the native client application at each of the one or more user devices, and the web client application at the second computer system, are each configured to request and receive the corresponding media content from the first computer system.

10. The system of claim 8, wherein the native client application at each of the one or more user devices, and the web client application at the second computer system, are each configured to request and receive the corresponding media content from one another.

11. A method for early media buffering using prediction of user behavior, comprising:
   providing a user interface, which displays a plurality of media options from which particular media options can be selected;
   providing a click determination logic which is configured so that a first click or other event associated with a particular media option at the user interface is passed singly to a media application, without trapping for a possible double-click event associated with the particular media option;
   interpreting, by the media application that includes a data buffering logic and a media content buffer, the first click or other event associated with the particular media option as a likely selection by a user of the particular media option, and using information associated with the likely selection of the particular media option to begin buffering a corresponding media content, including that
      the data buffering logic, in response to the first click or other event associated with the particular media option, instructs the media application to populate the media content buffer with the corresponding media content retrieved from a media database, and
      the media content buffer receives the corresponding media content from the media database, prior to streaming of the media content; and
   determining, by the media application, that,
      if a second click or other event associated with the particular media option is received at the user interface within a subsequent time interval, then treating the second click or other event as confirmation of the user's selection, and communicating the second click or other event to the data buffering logic to cause the corresponding media content to be streamed from its media content buffer, and
      if the second click or other event associated with the particular option is not received within the subsequent time interval, then the media content in the media content buffer is to be discarded without being streamed.

12. The method of claim 11,
   wherein the user interface is provided by a client application at a user device, and enables selection of media content to be streamed to the user device,
   wherein the click determination logic, and the media application that includes the data buffering logic and the media content buffer, is provided at a computer system, and
   wherein the corresponding media content is retrieved from a media database at the computer system, to populate the media content buffer at the computer system, for streaming to the user device.

13. The method of claim 11, wherein the information associated with the likely selection of the particular media option is a key setup information, which the media application uses to determine the corresponding media content, and a stream to which the corresponding media content is to be streamed.

14. The method of claim 13, wherein the key setup information is used to instruct the media application to populate one or more of a plurality of streams with media content retrieved from the media database.

15. The method of claim 11,
   wherein the user interface, the click determination logic, and the media application that includes the data buffering logic and the media content buffer, are provided at a first computer system, and
   wherein the corresponding media content is retrieved from a media database at a second computer system, to populate the media content buffer at the first computer system.

16. A non-transitory computer readable storage medium, including instructions stored thereon which when read and executed by one or more computers cause the one or more computers to perform the steps comprising:
   providing a user interface, which displays a plurality of media options from which particular media options can be selected;
   providing a click determination logic which is configured so that a first click or other event associated with a particular media option at the user interface is passed singly to a media application, without trapping for a possible double-click event associated with the particular media option;
   interpreting, by the media application that includes a data buffering logic and a media content buffer, the first click or other event associated with the particular media option as a likely selection by a user of the particular media option, and using information associated with the likely selection of the particular media option to begin buffering a corresponding media content, including that
      the data buffering logic, in response to the first click or other event associated with the particular media option, instructs the media application to populate the media content buffer with the corresponding media content retrieved from a media database, and the media content buffer receives the corresponding media content from the media database, prior to streaming of the media content; and determining, by the media application, that,
if a second click or other event associated with the particular media option is received at the user interface within a subsequent time interval, then treating the second click or other event as confirmation of the user's selection, and communicating the second click or other event to the data buffering logic to cause the corresponding media content to be streamed from its media content buffer, and if the second click or other event associated with the particular option is not received within the subsequent time interval, then the media content in the media content buffer is to be discarded without being streamed.

17. The non-transitory computer readable storage medium of claim 16,
wherein the user interface is provided by a client application at a user device, and enables selection of media content to be streamed to the user device,
wherein the click determination logic, and the media application that includes the data buffering logic and the media content buffer, is provided at a computer system, and
wherein the corresponding media content is retrieved from a media database at the computer system, to populate the media content buffer at the computer system, for streaming to the user device.

18. The non-transitory computer readable storage medium of claim 16, wherein the information associated with the likely selection of the particular media option is a key setup information, which the media application uses to determine the corresponding media content, and a stream to which the corresponding media content is to be streamed.

19. The non-transitory computer readable storage medium of claim 18, wherein the key setup information is used to instruct the media application to populate one or more of a plurality of streams with media content retrieved from the media database.

20. The non-transitory computer readable storage medium of claim 16,
wherein the user interface, the click determination logic, and the media application that includes the data buffering logic and the media content buffer, are provided at a first computer system, and
wherein the corresponding media content is retrieved from a media database at a second computer system, to populate the media content buffer at the first computer system.

* * * * *